(12) United States Patent
Li et al.

(10) Patent No.: US 7,742,875 B2
(45) Date of Patent: Jun. 22, 2010

(54) METHOD FOR GEOLOGIC MODELING THROUGH HYDRODYNAMICS-BASED GRIDDING (HYDRO-GRIDS)

(75) Inventors: Dachang Li, Katy, TX (US); Tao Sun, Missouri City, TX (US); Chun Huh, Austin, TX (US); Chris J. Donofrio, The Woodlands, TX (US); John C. Van Wagoner, Houston, TX (US); Max Deffenbaugh, Califon, NJ (US)

(73) Assignee: ExxonMobil Upstream Research Company, Houston, TX (US)

( * ) Notice: Subject to any disclaimer, the term of this patent is extended or adjusted under 35 U.S.C. 154(b) by 201 days.

(21) Appl. No.: 11/629,822

(22) PCT Filed: Jun. 24, 2005

(86) PCT No.: PCT/US2005/021991

§ 371 (c)(1),
(2), (4) Date: Dec. 15, 2006

(87) PCT Pub. No.: WO2006/007466

PCT Pub. Date: Jan. 19, 2006

(65) Prior Publication Data

US 2007/0219724 A1    Sep. 20, 2007

Related U.S. Application Data

(60) Provisional application No. 60/584,617, filed on Jul. 1, 2004.

(51) Int. Cl.
*G01V 1/28* (2006.01)
*G06F 19/00* (2006.01)

(52) U.S. Cl. .................. 702/12; 702/5; 702/16

(58) Field of Classification Search .................. 702/2, 702/5, 12, 13, 14, 16, 17, 18; 703/2, 10; 367/68, 72, 73; 166/249; 345/423
See application file for complete search history.

(56) References Cited

U.S. PATENT DOCUMENTS 3,946,356 A    3/1976    Anstey .................. 340/15.5

(Continued)

FOREIGN PATENT DOCUMENTS

WO    WO2004/083896    9/2004

(Continued)

OTHER PUBLICATIONS

"Brochure for Earth Decision Suite" Earth Decision Sciences Corporation, *gOcad*, 1989-2003.

(Continued)

*Primary Examiner*—John H Le (57) ABSTRACT

The present invention is a method of hydrodynamics-based gridding (Hydro-Grids) for creating geologic models of subsurface volumes, such as reservoirs. Vertical grid surfaces may be chosen in an unstructured fashion to provide lateral resolution where needed. Lateral grid surfaces are created to represent surfaces of constant geologic time based on simulation of the depositional processes that created the subsurface volume. The values of geologic properties are then specified within each cell created by the intersections of the vertical and lateral surfaces. The geologic data may include, for example, seismic data, outcrop studies, well log data, core data, numerical modeling data, and interpreted stratigraphic surfaces based on seismic data. The modeled geologic properties of the subsurface volume may include, for example, grain size distribution, connectivity, net-to-gross, porosity, permeability and pore pressure.

16 Claims, 6 Drawing Sheets

U.S. PATENT DOCUMENTS

| | | | |
|---|---|---|---|
| 4,821,164 A | 4/1989 | Swanson | 364/420 |
| 4,991,095 A | 2/1991 | Swanson | 364/421 |
| 5,638,269 A | 6/1997 | Fournier et al. | 364/422 |
| 5,838,634 A | 11/1998 | Jones et al. | 367/73 |
| 5,844,564 A | 12/1998 | Bennis et al. | 345/423 |
| 5,844,799 A | 12/1998 | Joseph et al. | 364/420 |
| 5,953,680 A | 9/1999 | Divies et al. | 702/5 |
| 6,018,497 A | 1/2000 | Gunasekera | 367/72 |
| 6,106,561 A | 8/2000 | Farmer | 703/10 |
| 6,401,042 B1 | 6/2002 | Van Riel et al. | 702/17 |
| 6,480,790 B1 | 11/2002 | Calvert et al. | 702/14 |
| 6,490,526 B2 | 12/2002 | Matteucci et al. | 702/5 |
| 6,597,995 B1 | 7/2003 | Cornu et al. | 702/17 |
| 6,675,102 B1 | 1/2004 | Baker, III | 702/14 |
| 6,814,141 B2 | 11/2004 | Huh et al. | 166/246 |
| 6,885,941 B2 | 4/2005 | Deffenbaugh et al. | 702/2 |
| 7,006,959 B1 | 2/2006 | Huh et al. | 703/10 |
| 7,043,410 B2 | 5/2006 | Malthe-Sorenssen et al. | 703/2 |
| 7,062,383 B2 | 6/2006 | Deffenbaugh et al. | 702/2 |
| 2003/0115029 A1 | 6/2003 | Calvert et al. | 703/10 |

FOREIGN PATENT DOCUMENTS

| | | |
|---|---|---|
| WO | WO2004/093521 | 11/2004 |
| WO | WO2005/104003 | 11/2005 |
| WO | WO2006/031383 | 3/2006 |
| WO | WO2006/036389 | 4/2006 |

OTHER PUBLICATIONS

"Manual for Stratamodel" Landmark Graphics Corporation, *Stratamodel Geocellular Modeling (SGM)*, 1989-2003.

"Brochure for Stratamodel" Zycor a division of Landmark Graphics Corporation, *Stratamodel Geocellular Modeling (SGM)*, 1989-2003.

"Online Brochure for RMS" Roxar ASA, *Irap-RMS (Reservoir Modeling Systems)*, 1993-2003.

"Online Brochure for Petrel" Technoguide (A Schlumberger Product Group), *Petrel198 Workflow Tools*, 1996-2003.

Bezemer, T.D. et al. (1999) "Numerical Modeling of Fault-Related Sedimentation," SEPM Special Publications No. 62, *Numerical Experiments in Stratigraphy: Recent Advances in Stratigraphic and Sedimentologic Computer Simulations*, SEPM (Society for Sedimentary Geology), pp. 177-196.

Campbell, C. V., (1967) "Lamina, Laminaset, Bed and Bedset," *Sedimentology*, vol. 8, pp. 7-26.

Durlofsky, L. J.: "Numerical Calculation of Equivalent Grid Block Permeability Tensors for Heterogeneous Porous Media," *Water Resources Research* (May 1991) 27, No. 5, p. 699.

Evans, S. (2004) "Reservoir Modeling and Simulation in Today's High-Performance Computing Environments," *Oil & Gas Journal*, pp. 33-36.

Lawrence, D. et al. (1990) "Stratigraphic Simulation of Sedimentary Basins: Concepts and Calibration," *American Assoc. of Petroleum Geologists Bulletin*, v. 74.3, pp. 273-295, 21 Figs., 1 Table.

Li, D. et al. (2000) "Optimal Uplayering for Scaleup of Multimillion-Cell Geologic Models," *Society of Petroleum Engineers*, SPE 62927, SPE Ann'l Tech. Conf. and Exhibit, Dallas, Texas, Oct. 1-4.

Li, D. et al. (2001) "A New Efficient Average Technique for Scaleup of Multimillion-Cell Geologic Models," *Soc. of Petroleum Eng. Reservoir Evaluation & Engineering* (Aug. 2001), p. 297.

Pickup, et al. (1994) "Permeability Tensors for Sedimentary Structures," *Mathematical Geology*, v 26, p. 227.

Stern, D. et al. (1999) "A Technique for Generating Reservoir Simulation Grids to Preserve Geologic Heterogeneity," SPE 51942 *Society of Petroleum Engineers*, Feb. 14-17.

EP Standard Search Report No. 111722 dated Jan. 13, 2005, 2 pgs.

PCT Search and Written Opinion dated Feb. 22, 2006, 4 pages.

Rawlinson, N., et al., "Wave front evolution in strongly heterogeneous layered media using the fast marching method", Geophys. J. Int. (2004) 156, 631-647.

METHOD FOR GEOLOGIC MODELING THROUGH HYDRODYNAMICS-BASED GRIDDING (HYDRO-GRIDS)

This application is the National Stage of International Application No. PCT/US05/21991, filed 24 Jun. 2005, which claims the benefit of U.S. Provisional Patent Application No. 60/584,617 filed on Jul. 1, 2004.

FIELD OF THE INVENTION

This invention relates generally to the fields of geophysical prospecting and reservoir characterization. More specifically, the invention is a method for creating geologic models permitting enhanced representation of the properties of a subsurface volume, such as a reservoir or basin.

BACKGROUND OF THE INVENTION

A geologic model is a computer-based representation of a subsurface earth volume, such as a petroleum reservoir or a depositional basin. In the oil and gas industry, geologic models are commonly used in activities such as determining the locations of wells, estimating hydrocarbon reserves, or planning reservoir-development strategies. Geologic models are also input to fluid flow simulations to test development and production scenarios in order to optimize return on investment. A key parameter in flow simulation is the spatial distribution of permeability, which together with the properties of the hydrocarbons and other fluid found in the subsurface reservoir, determines the producibility of the reservoir. Typically, the input data for geologic models includes data obtained through seismic prospecting techniques.

Seismic prospecting techniques are commonly used to aid in the search for and evaluation of subterranean hydrocarbon reservoirs. A seismic prospecting operation consists of three separate stages: data acquisition, data processing, and data interpretation. The success of the operation depends on satisfactory completion of all three stages.

In the data acquisition stage, a seismic source is used to generate an acoustic signal that propagates into the earth and is at least partially reflected by subsurface seismic reflectors. The reflected signals are detected and recorded by an array of seismic receivers located at or near the surface of the earth, in an overlying body of water, or at known depths in boreholes.

During the data processing stage, the recorded seismic signals are refined and enhanced using a variety of procedures that depend on the nature of the geologic structure being investigated and on the characteristics of the raw data. In general, the purpose of the data processing stage is to produce an image of the subsurface from the recorded seismic data for use during the data interpretation stage.

The purpose of the data interpretation stage is to determine information about the subsurface geology of the earth from the processed seismic data. The results of the data interpretation stage may be used to determine the general geologic structure of a subsurface region, or to locate potential hydrocarbon reservoirs, or to guide the development of an already discovered reservoir.

At present, the conclusions, which can be made after the data interpretation stage, are generally limited to broad descriptions of the size and general nature of subsurface structures due to the limited resolution of seismic data. The descriptions may for example provide an indication of the total volume of hydrocarbons, which might be retained in such structures. However, present technology does not allow the analyst to determine production rates from the subsurface formations if hydrocarbons are discovered. In addition, when an exploration well has been drilled, present technology does not allow an analyst to be able to accurately characterize the nature of the subsurface internal geometry in locations other than in the most immediate region of any such well. In particular, reservoir permeability and continuity are not well characterized by present technology.

The hydrocarbon volume and rate of production depend on a variety of factors, including fluid properties, reservoir net-to-gross, porosity, permeability, spatial variability in grain size distribution, and connectivity. Reservoir connectivity, a measure of the communication (or lack thereof) between points within the reservoir, is a strong function of the reservoir internal geometry and is commonly a primary factor controlling hydrocarbon production efficiency and ultimate recovery. There is a need to predict the detailed internal geometry of subsurface reservoirs using geologic data, such as seismic data, and without having to drill many exploration and delineation wells. Such a capability would facilitate estimation of hydrocarbon volume in place and production rates early in the hydrocarbon exploration and development process.

Another step in geologic modeling is "gridding." Gridding is the division of the subsurface region into cells, within which the rock properties are regarded as uniform. The ability to accurately model reservoir internal geometry and connectivity is largely dependent on the vertical grids used in the modeling processes due to the nature of stratification and vertical heterogeneity in the reservoir. As a result, the gridding methods in geologic modeling focus mainly on the vertical variation of attributes of a geologic model. In map view, uniform rectangular grids are commonly used for relatively small variations of attributes in the lateral directions.

There are four gridding methods commonly used in commercially available geologic modeling tools. Examples of commercially available geologic modeling tools include: SGM (Landmark Graphics Corporation, *Stratamodel Geocellular Modeling (SGM)*, 1989-2003), RMS (Roxar ASA, *Irap RMS (Reservoir Modeling Systems)*, 1993-2003), gOcad (Earth Decision Sciences Corporation, *gOcad*, 1989-2003), and Petrel (Technoguide (A Schlumberger Product Group), *Petrel™ Workflow Tools*, 1996-2003). The four gridding methods used in the petroleum industry are commonly named proportional, onlap, truncation, and reference. The name of each method can vary from one tool to another. For example, "reference-grid" in RMS is the same as "depositional-grid" in SGM. The choice of the most appropriate gridding method to use when building a geologic model depends on the geologic modeler's experience and personal judgement of the model's particular geologic setting. Gridding style, however, was created to mimic natural patterns of erosion and deposition observed in nature at the seismic scale.

The gridding methods used in the most commercially available geologic modeling tools (such as, SGM, RMS, gOcad, and Petrel) are based on methods disclosed in two of Swanson's patents. The patents are U.S. Pat. Nos. 4,821,164 and 4,991,095.

FIG. 1(*a*) is a cross-section illustration of stratification of sand bodies 1, 2, 3, 4 and 5 and low permeability layers 6. FIGS. 1(*b*), 1(*c*), 1(*d*), and 1(*e*) illustrate sand bodies 1, 2, 3, 4, and 5 and low permeability layers 6 from FIG. 1(*a*) using conventional grids.

As shown in FIG. 1(*b*), "Proportional-grid" assumes that the reservoir sand bodies 1, 2, 3, 4, and 5 within the given sequence are parallel to the top 7 and basal surfaces 9 of the sequence 11. Therefore, the sequence is subdivided into the cells 13 proportional to the thickness of the sequence 11.

Figure 1A:
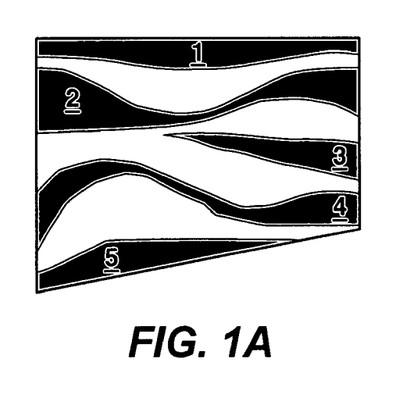
FIG. 1(a) is a cross-section illustration of original sand bodies.
Figure 1B:
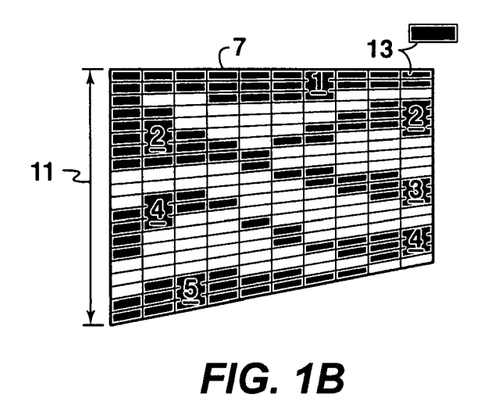
FIG. 1(b) is a cross-section illustration of proportional-grids representation of the original sand bodies in FIG. 1(a)
Figure 1C:
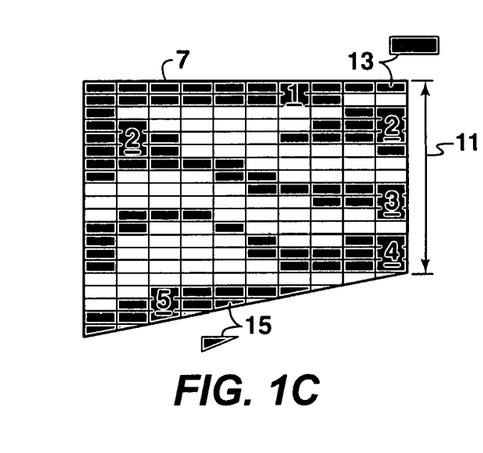
FIG. 1(c) is a cross-section illustration of onlap-grids representation of the original sand bodies in FIG. 1(a)

As shown in FIG. 1(c), "Onlap-grid" assumes that the sand bodies 1, 2, 3, 4, and 5 are parallel to the top surface 7 of the sequence 11. The sequence 11 is gridded with the constant thickness cells 13 that are parallel to the top surface 7 and may be truncated 15 by the basal surface 9 of the sequence 11.

Figure 1D:
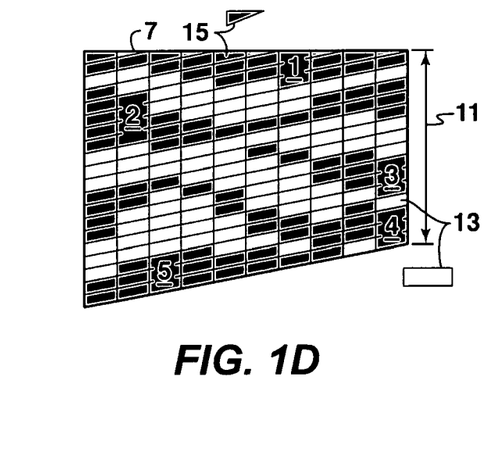
FIG. 1(d) is a cross-section illustration of truncation-grids representation of the original sand bodies in FIG. 1(a)

As shown in FIG. 1(d), "Truncation-grid" assumes that the sand bodies 1, 2, 3, 4, and 5 are parallel to the basal surface 9 of the sequence 11. The sequence 11 is gridded with the constant thickness cells 13 that are parallel to the basal surface 9 and may be truncated 15 by the top surface 7 of the sequence 11.

Figure 1E:
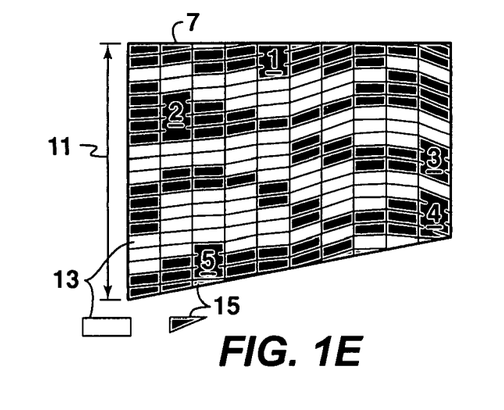
FIG. 1(e) is a cross-section illustration of reference-grids representation of the original sand bodies in FIG. 1(a)

As shown in FIG. 1(e), "Reference-grid" assumes that the sand bodies 1, 2, 3, 4, and 5 are parallel to a given surface (or reference surface) 17, such that the constant thickness cells 13 are constructed parallel to the reference surface 17 and may be truncated 15 by the top 7 and basal surfaces 9 of the sequence 11. The reference surface 17 is usually some sort of geologic datum. In this figure, the reference surface is the bottom of sand body 2.

The problem is that none of these gridding methods represent the true internal geometry accurately. To illustrate this problem, there are five disconnected sand bodies 1, 2, 3, 4, and 5 within the sequence 11 of FIG. 1(a) and the above gridding methods create significantly distorted representations as shown in FIGS. 1(b), 1(c), 1(d), and 1(e) when compared to FIG. 1(a). Sand body 1 is incorrectly connected with sand body 2 in the proportional-grids and onlap-grids as illustrated in FIGS. 1(b) and 1(c) respectively. As shown in FIG. 1(c), sand body 2 is incorrectly connected with sand body 3 in the onlap-grids. Furthermore, sand body 4 is incorrectly connected with sand body 5 in the truncation-grids of FIG. 1(d).

Some sand bodies are incorrectly disconnected within themselves. For example, sand body 4 is disconnected in the proportional-grids of FIG. 1(b) and sand body 2 is disconnected in the onlap-grids of FIG. 1(c). Furthermore, some sand bodies are erroneously disconnected from the fluid flow since some cells in these sand bodies only contact their neighbor cells at the corners, without face connections. For example, sand body 2 is disconnected in the proportional-grids of FIG. 1(b) and sand body 4 is disconnected in all of the four gridding methods as shown in FIGS. 1(b), 1(c), 1(d), and 1(e). Misalignment between the sand bodies and grids is the direct cause of this distortion problem.

The grids constructed by the above-mentioned prior art methods do not properly align themselves with the reservoir internal geometry. The alignment between the grids and the reservoir internal geometry is important for two reasons. First, any lack of alignment distorts the reservoir connectivity in the geologic model subsequently built. Second, when the geologic model is scaled up for reservoir performance simulation with coarser grids, the coarser grids will magnify the misrepresentations and distortions that exist in the geologic model. Consequently, the accuracy of any reservoir performance prediction will decrease, which will hamper reservoir management.

A reliable reservoir performance simulation depends strongly on the ability of a geologic model to accurately characterize the spatial distribution of permeability. Most important are the permeability extremes, such as high-permeability sand bodies and no-flow shale barriers, because the permeability extremes typically control the oil, gas, and water flows. The ability to model permeability is currently severely limited by the commercially available geologic model gridding methods. One reason that the existing geologic modeling tools have to adopt arbitrary lateral grid surfaces is that the actual strata geometry (or layering) of the sand objects is not known a priori. As a consequence, the reservoir connectivity is typically misrepresented in geologic models and the resulting performance simulation models. Accordingly, there is a need for a method that generates grids that follow the geometry of sand bodies and shale barriers. Preferably, these grids would allow the reservoir connectivity to be accurately characterized in a geologic model and preserved during upscaling for reservoir performance simulation. The current invention addresses the need by generating the lateral grid surfaces naturally, following the complex depositional and erosional processes observed in nature.

SUMMARY OF THE INVENTION

Under the present techniques, various embodiments of a hydrodynamics-based gridding method, called "Hydro-Grids", may generate grid surfaces conforming to time surfaces during the process of sedimentation, which create a subsurface sedimentary volume. The location of these time surfaces is typically determined by sedimentary process simulation and interpretation of geologic data. Since these surfaces can precisely follow the geometry of sand bodies and shale barriers, geologic models conforming to these surfaces may accurately characterize sedimentary connectivity and may preserve their accuracy during upscaling for reservoir performance simulation.

In one embodiment, a method comprises obtaining geologic data, creating horizontal grid lines wherein at least one horizontal grid line represents deposit time lines based on the deposition rates from the geologic data, creating vertical grid lines, and modeling the sedimentary properties of the sedimentary basin or reservoir from the grids of geologic data created by the vertical and horizontal grid lines. The geologic data used includes but is not limited to seismic data, outcrop studies, well log data, core data, forward and inverse modeling data, correlation of seismic data to sedimentary data. The modeled sedimentary properties of the reservoir include, but are not limited to grain size distribution, connectivity, net-to-gross, porosity, permeability, pore pressure and any combination thereof.

A second embodiment for geologic modeling of a sedimentary basin or reservoir is also disclosed. This embodiment comprises obtaining geologic data, creating at least one horizontal grid line based on an estimated time from the deposition and erosion in the geologic data, determining stratigraphic hierarchy levels of the horizontal grid lines, merging neighboring horizontal grid lines, upscaling the merged layers based on the stratigraphic hierarchy, estimating sedimentary properties from the upscaled merged layers. The hierarchy levels assigned to the horizontal grid lines are selected from methods including but not limited to changes in the inlet conditions, changes in the simulation conditions, variations in the vertical distribution of the composition of the simulated deposit and any combination thereof.

A method for geologic modeling of a subsurface volume, such as a geologic basin or reservoir, is disclosed. In one embodiment the method comprises obtaining geologic data, creating vertical grid surfaces to divide the subsurface volume into "columns", creating lateral grid surfaces to correspond with surfaces of constant geologic time during the creation of the geologic structures in the subsurface volume, and representing the geologic properties of the subsurface volume within the grids cells bounded by the vertical and lateral grid surfaces. The geologic data used may include, but is not limited to, seismic data, outcrop studies, well log data, core data, data from numerical modeling of geological processes, stratigraphic surfaces interpreted from seismic data. The modeled geologic properties of the reservoir may include, but are not limited to, grain size distribution, connectivity, net-to-gross, porosity, permeability, pore pressure and any combination thereof.

A second embodiment for geologic modeling of a subsurface volume is also disclosed. This embodiment comprises obtaining geologic data, creating vertical grid surfaces to divide the subsurface volume into "columns", creating lateral grid surfaces to correspond with surfaces of constant geologic time during the creation of the geologic structures in the subsurface volume, representing the geologic properties of the subsurface volume within the grid cells bounded by the vertical and lateral grid surfaces, merging selected grid cells to reduce the number of cells in the model, and establishing new values for the geologic properties in the merged grid cells.

DETAILED DESCRIPTION

In the following detailed description, the invention will be described in connection with its preferred embodiments. However, to the extent that the following description is specific to a particular embodiment or a particular use of the invention, this is intended to be illustrative only. Accordingly, the invention is not limited to the specific embodiments described below, but rather, the invention includes all alternatives, modifications, and equivalents falling within the true scope of the appended claims.

Hydro-Grids are grids created by sedimentary process simulation. The Hydro-Grids lateral or horizontal surfaces, which may include and be represented by grid lines, are time surfaces recorded during the simulation of sand deposition/erosion. The grid surfaces follow the sand body shapes and their internal architecture (structure) naturally without any assumptions used by the existing geologic model gridding methods. Therefore, the sand body shapes and their internal structure can be precisely maintained for reservoir performance simulation.

Figure 2:
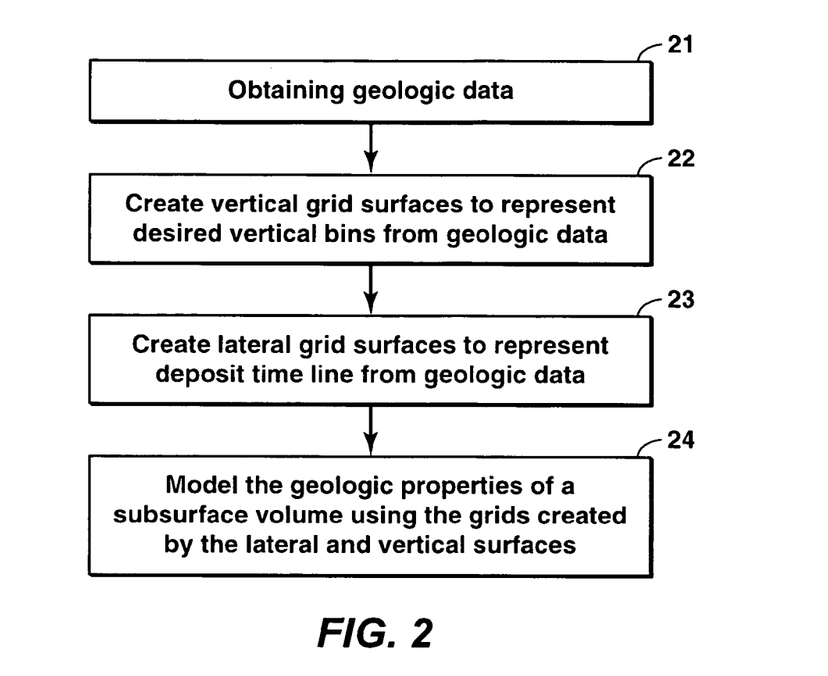
FIG. 2 is a flow chart of a first embodiment of the invention.

As shown in FIG. 2, one embodiment has four steps. In reference to numeral 21 of FIG. 2, geologic data is obtained. Now referring to numeral 22, vertical grid surfaces (lines) are created to divide the subsurface volume into "columns" of limited lateral extent. Now referring to numeral 23, horizontal or lateral grid surfaces (lines), which may be substantially or relatively horizontal, are created to correspond with surfaces of geologic time associated with the original deposition of the sediments that fill the subsurface volume. Together, the vertical and lateral grid surfaces (lines) divide the subsurface volume into grid cells. Now referring to numeral 24, the geologic properties of the subsurface volume are represented by assigning to each grid cell a particular value for each geologic property. The geologic properties include but are not limited to grain size distribution, connectivity, net-to-gross, porosity, permeability and pore pressure.

Now referring to numeral 21 in FIG. 2, the geologic data is typically seismic data, but can also include core data, well logs, outcrop studies, time dating of deposits, numerical modeling results, geologic models, and interpreted stratigraphic surfaces. This data will typically include information that can aid in choosing the location of the surfaces, which may divide the subsurface volume into cells. Typically, this includes data on the lateral rates of change of geologic properties, which indicate how far apart vertical surfaces can be placed without losing accuracy. This also includes data that can aid in establishing boundary conditions for the numerical simulation of sedimentation which is part of the preferred embodiment for determining the spacing between the lateral surfaces in the step shown by numeral 23 of FIG. 2.

Figure 3:
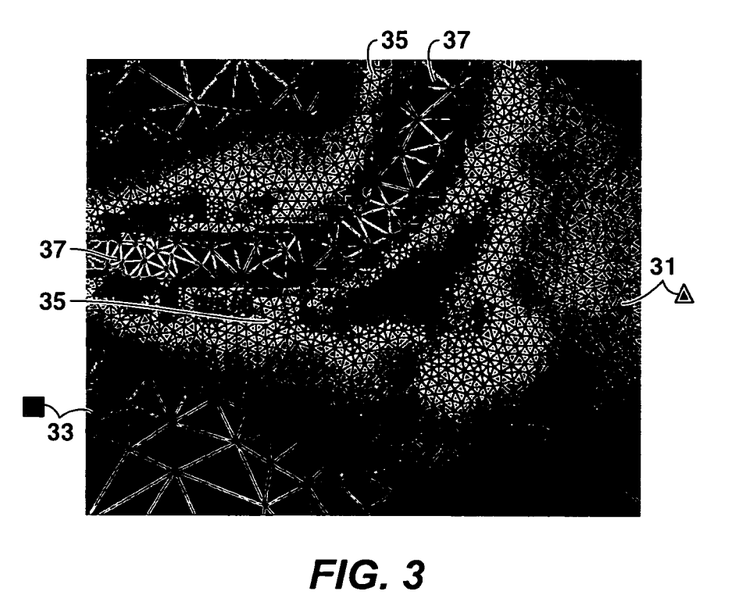
FIG. 3 is a top view of 4671 unstructured-cell deposit that would need 24806 structured grid cells for the same resolution.

Now referring to numeral 22 in FIG. 2, vertical grid surfaces (lines) are selected to divide the subsurface volume into "columns". This can be done for both structured and unstructured gridding. In top or map view, for structured gridding, the vertical grid surfaces (lines) would divide the subsurface volume into uniform rectangular or square cells, while in unstructured gridding, the vertical grid surfaces (lines) could divide the volume into cells of varying shapes and sizes. The use of unstructured grids provides two advantages over structured grids. First, fine-scale cells can be constructed where the change in geologic properties is rapid, while coarse-scale cells can be used where the properties change slowly. As a result, the number of cells required to represent the subsurface volume with a particular level of accuracy should be significantly smaller with unstructured grid cells than with structured grid cells. For example, FIG. 3 shows a map view of 4,671 unstructured-cell deposit that would need 24,806 structured grid cells 33 for the same accuracy. Second, due to increased flexibility, unstructured grids capture deposit shapes very accurately, while the structured grids may distort the deposit shapes with the same number of cells. These shapes include the delta fan deposit 35 and the channel 37 cutting through the delta fan deposit 35.

Now referring to numeral 23 in FIG. 2, the determination of lateral grid surfaces (lines) is typically accomplished with the aid of a numerical simulation of sedimentary processes. For example, SEDSIM, a product of CSIRO Petroleum Resources, is a suitable sedimentary process simulator that is commercially available and known to persons skilled in the art. The preferred embodiment uses the numerical simulation technique described in PCT Publication No. WO2006/036389.

Determining the lateral grid surfaces (lines) typically includes various steps. First, a basal surface for a subvolume within the subsurface volume is determined from seismic data. This is accomplished by a skilled seismic interpreter according to methods familiar to persons of ordinary skill in the art. Second, the basal surface is adjusted to correct its dip and orientation to the original position of the surface at the time of deposition. Depending on the nature and degree of post-depositional change, this may include a rotation of the surface to restore the paleoslope and unbending the surface to remove the effect of subsidence. The size and degree of these adjustments is determined according to the judgement of skilled interpreters as will be understood by persons of ordinary skill in the art. Computer simulation of subsidence and other post-depositional processes may assist in this determination (e.g., Bezemer, T. D., Kooi, H., and Cloetingh: "Numerical Modeling of Fault-Related Sedimentation," SEPM Special Publications No. 62, Numerical Experiments in Stratigraphy: Recent Advances in Stratigraphic and Sedimentologic Computer Simulations, SEPM (Society for Sedimentary Geology) 1999). Third, a numerical simulation of the sedimentary processes, which may fill the subsurface volume, is performed over the adjusted basal surface. Such simulations run forward in geologic time, computing the amount and nature of sediment deposited at each location at each time step. The top surfaces of the simulated deposit are recorded at regular time steps. The number of layers in the geologic model may be controlled by changing the time step size. Alternatively, the top surfaces may be recorded only at time steps when a significant change in deposition rate or deposited sediment properties occurs. These steps may be iterated to adjust the boundary conditions of the simulation until good correspondence is achieved between the simulated deposit and the geologic data. Finally, if transformations were applied to the basal surface prior to simulation, the reverse of these transformations are applied to the basal surface and all computed top surfaces, so that the surfaces are moved to their likely present-day position.

If, during the simulation, the flow is near steady state and predominantly depositional, the deposit composition is vertically homogeneous, and lateral grid surfaces may be separated by an extended period of simulation time. However, if the flow is highly transient with significant avulsions, the lateral grid surfaces may be defined at much smaller time intervals. This non-uniform-layering method ensures that the rock properties are as homogeneous as possible within a layer, which effectively characterizes reservoir connectivity.

During and after the simulation for a particular subvolume, there are several adjustments that are typically made to the lateral grid surfaces (lines). First, the vertical coordinates of a lateral grid surface (line) may be adjusted to account for any removal of sediment by erosion after the original sediment in the layer is deposited. Otherwise the lateral grid surfaces (lines) may cross each other, which is not permitted. Second, it may be found that certain lateral grid surfaces (lines) created in simulation may not match in location the corresponding actual surfaces observed in seismic data, well logs, or other forms of geologic data as described in numeral 21 of FIG. 2. In this case, the lateral grid surfaces (lines) may be altered manually, or the boundary conditions for the simulation may be adjusted until a more favorable correspondence between the simulated and observed surfaces is obtained. The adjustment of boundary conditions is the preferred method when possible. However, in practice, this can be time consuming and may not produce an adequate correspondence, in which case manual adjustment may be made.

Now referring to numeral 24 in FIG. 2, the geologic properties of the subsurface volume are represented by assigning values for these properties to each of the grid cells created by the intersections of the vertical and lateral grid surfaces (lines). Typically, these values are determined by the same numerical simulation, which established the location of the lateral grid surfaces (lines).

Figure 4A:
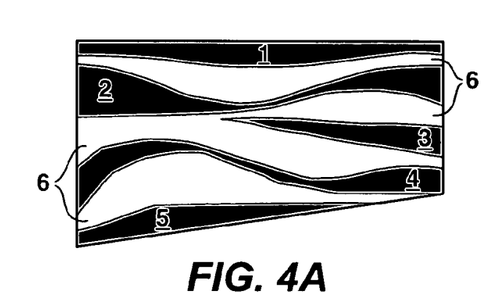
FIG. 4(a) is a cross-section illustration of original sand bodies similar to FIG. 1(a)
Figure 4B:
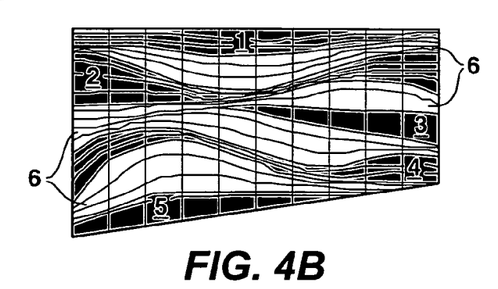
FIG. 4(b) is a cross-section illustration of the sand bodies from FIG. 3(a) in Hydro-Grids.

An example of Hydro-Grids is shown in FIG. 4. FIG. 4(a) shows a cross-section of a simulated subsurface volume. In FIG. 4(b), the Hydro-Grids gridding method preserves the shapes of the five sand bodies 1, 2, 3, 4, and 5 between the low permeability layers 6. Because the Hydro-Grids surfaces (lines) follow the sand body shapes in FIG. 4(b), the connectivity between and within the original sand bodies in FIG. 4(a) is accurately represented.

Figure 5:
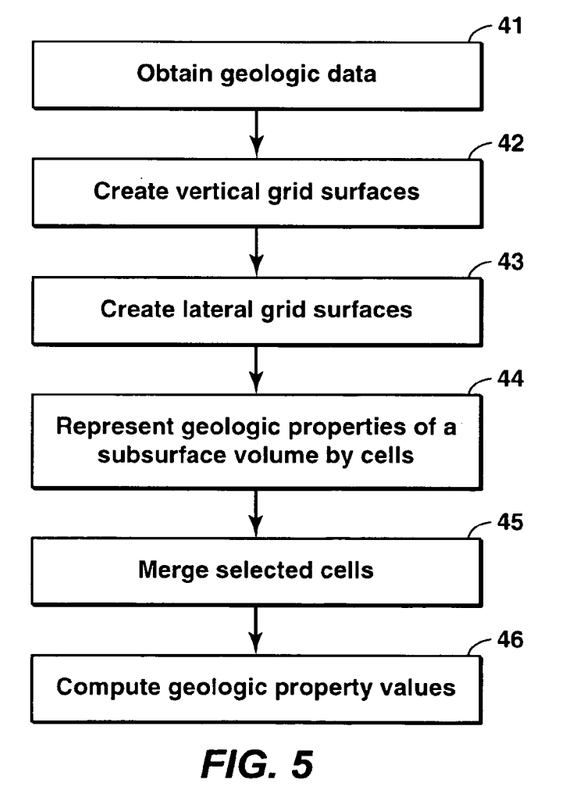
FIG. 5 is a flow chart of a second embodiment of the invention.

As shown in FIG. 5, one embodiment is now disclosed. Now referring to numeral 41 of FIG. 5, geological data is obtained. Now referring to numeral 42 of FIG. 5, vertical grid surfaces (lines) are created to divide the subsurface volume into "columns" of limited lateral extent. Now referring to numeral 43 of FIG. 5, lateral grid surfaces (lines), which may be substantially or relatively horizontal, are created which correspond with surfaces of geologic time associated with the original deposition of the sediments that fill the subsurface volume. Together, the vertical and lateral grid surfaces (lines) divide the subsurface volume into grid cells. Now referring to numeral 44 of FIG. 5, the geologic properties of the subsurface volume are represented by assigning to each grid cell a particular value for each geologic property. Now referring to numeral 45 of FIG. 5, selected cells are merged to reduce the total number of cells. Now referring to numeral 46 in FIG. 5, the geologic property values are computed for the merged cells. The steps and various embodiments are discussed in greater detail below.

Now referring to numeral 41 in FIG. 5, the input geologic data is obtained, which guides the sedimentary process simulation. The input data includes initial conditions, boundary conditions, and sediment discharge history. The initial conditions are composed of the initial (paleo) topography, depositional environments (deep or shallow water), and the erodability of the initial topography. The boundary conditions consist of inlet locations, inlet geometry, and the basin boundary flow conditions (no-flow or out-flow). The sediment discharge history consists of the flow velocity, sediment-laden flow layer thickness, sediment concentration, and the sediment grain-size distribution function. The input data also includes information about locations of stratigraphic surfaces in the subsurface volume as described in numeral 21 of FIG. 2.

For the reference numerals 42, 43 and 44, these steps may be similar to the steps discussed in FIG. 2. In particular, with reference numeral 42, the vertical grid surfaces are selected in a manner that is similar to the discussion of numeral 22 of FIG. 2. For reference numeral 43, the lateral grid surfaces are selected in a manner that is similar to the discussion of numeral 23 of FIG. 2. For reference numeral 44, the geologic properties are assigned to each grid cell is similar to the discussion of numeral 24 of FIG. 2.

Now referring to numeral 45 of FIG. 5, selected cells that share a common lateral grid surface (line) are merged to reduce the total number of cells in the model and thereby increase the speed of analyses that may subsequently be performed on the model. Another reason of merging the cells is to eliminate very thin cells that may cause numerical problems in reservoir performance simulation when using the geologic model. There are various criteria that can be used to determine which cells to merge. These criteria are clearly interrelated, and a combination of them maybe employed.

A first approach to merging the cells may include deposit property changes. The deposit property changes include determining the degree of change in the geologic properties across the cell boundary to determine whether the cells may be merged. Typically, a threshold of acceptable change is selected, and cells are merged for cells that have changes less than the threshold value.

A second approach to merging the cells may include a swept efficiency error (a combination effect of permeability, porosity, and other rock properties). A layer optimization technique can be used to determine the optimal layer-grouping schemes that minimize the errors of swept efficiency between the merged and original layers (cells). Layer optimization is a mature technology that is known to persons skilled in the art and can be found in a number of publications. Examples of publications that disclose layer optimization include Stern, D. and Dawson, A. G.: "A Technique for Generating Reservoir Simulation Grids to Preserve Geologic Heterogeneity," paper SPE 51942 presented at the 1999 SPE Reservoir Simulation Symposium held in Houston, Tex., 14-17 Feb., 1999; and Li, D. and Beckner, B.: "Optimal Uplayering for Scaleup of Multimillion-Cell Geologic Models," paper SPE 62927 presented at the 2000 SPE Annual Technical Conference and Exhibition held in Dallas, Tex., 1-4 Oct., 2000.

A third approach to merging the cells may include minimum thickness criteria. Minimum thickness criteria utilizes the thickness of the layers between lateral surfaces. Typically, a wide range in the thickness of the layers between lateral surfaces. Thin layers are generated near the edges of sand body lobes or where fine-grain sediments are deposited, with a sedimentary process simulation. Thick layers are generated near the lobe/channel centers or where coarse-grain sediments are deposited. Particularly very thin cells may cause numerical problems in reservoir performance simulation. A minimum thickness threshold is typically used to truncate very thin cells. If a cell is judged to be too thin, it may be assigned zero thickness and its actual thickness added to the cell above or the cell below, depending on which cell is closer in geological properties to the thin cell. The process is preferably continued until the thickness of the cells either exceeds the given threshold thickness or is equal to about zero. After merging the neighboring layers, some of layers may have zero thickness in some regions. Most reservoir performance simulators automatically treat the zero thickness cells as inactive cells. For example, Eclipse, a product of Schlumberger, is an example of a commercially available reservoir performance simulator that is known to persons skilled in the art.

A fourth approach to merging the cells may be stratigraphic hierarchy. Stratigraphic hierarchy includes associating the lateral surfaces between cells with particular levels in the stratigraphic hierarchy familiar to stratigraphers. This hierarchy uses classifications such as "lamina", "laminaset", "bed", and "bedset". Cells that share surfaces below a certain level in this hierarchy may be merged. For example, bed-scale and higher surfaces may be retained, while lamina and laminaset surfaces are removed. This hierarchy and the criteria for determining which level applies to a particular surface are described in *Lamina, Laminaset, Bed and Bedset*. See Campbell, C. V., *Lamina, Laminaset, Bed and Bedset*, Sedimentology, vol. 8 at 7-26 (1967). A lamina is the smallest megascopic layer that forms very rapidly from minutes to hours. A laminaset is a relative conformable succession of genetically related laminae bounded by surfaces of erosion, non-deposition or their correlative conformities, which forms rapidly from minutes to days. A bed is a relative conformable succession of genetically related laminae and laminasets bounded by surfaces (referred to as bedding surfaces) of erosion, non-deposition or their correlative conformities, which forms rapidly from minutes to years. A bedset is a group or set of conformable beds that differ in composition, texture, or sedimentary structure from those composing the beds above or below the bedset. Bedsets form over a longer period of time than beds. The stratigraphic hierarchy levels are associated with the corresponding levels of the changes of flow conditions. Avulsions and/or new inlet locations may create a high level of the hierarchy. Progradation, aggradation, and retrogradation may result in an intermediate level of the hierarchy and waves may generate a low level of the hierarchy. The stratigraphic hierarchy levels may be determined from the levels of the changes in the simulation conditions or from the inspection of the vertical distribution of the composition of the simulated deposit based on geologist's experience, as is conventionally done. The hierarchy levels assigned can be adjusted to achieve a favorable correlation with the cores, well logs, and seismic data.

In one embodiment, once it is established that two cells may be merged, one of the two cells is assigned "zero" thickness and the other cell is assigned the combined thickness of the two cells. If a lateral surface contacts at least one cell of zero thickness at every mapview location, then it can be removed. When merging two cells, the choice of which cell gets zero thickness is guided by the goal of removing as many lateral surfaces or regions as possible.

Figure 6A:
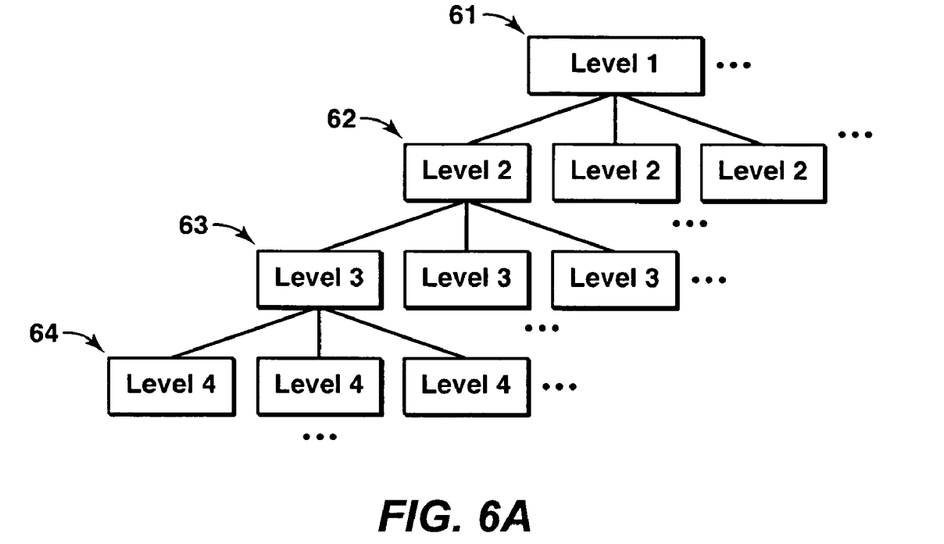
FIG. 6(a) is a hierarchy arrangement structure in a Hydro-Grids embodiment.
Figure 6B:
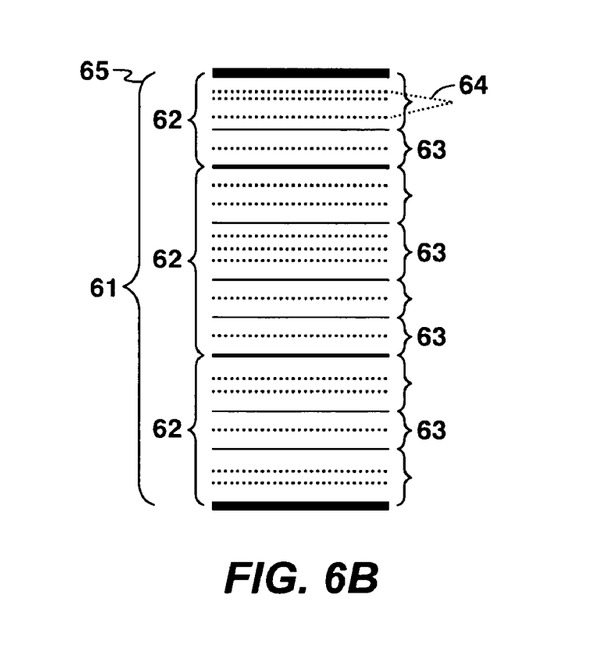
FIG. 6(b) is a hierarchy arrangement of geologic layers.

FIG. 6(a) illustrates a hierarchy arrangement of four levels or levels 1, 2, 3, and 4 labeled as 61, 62, 63, and 64 respectfully in the hierarchy arrangement for Hydro-Grids. FIG. 6(b) illustrates the hierarchy arrangement of layers 65 within levels 61, 62, 63 and 64. The hierarchy arrangement of geologic layers is an efficient, need-based data structure. For example, in the exploration and early development stages, available data is very limited and uncertainty is high. The high-level (coarse) layers, such as, levels 61 or 62, of the hierarchy arrangement can be directly used to build geologic models and performance simulation models in a more efficient manner than the conventional geologic modeling approaches. If studies on detailed oil recovery efficiency are required for production decisions, the low-level (fine) layers, such as, levels 63 or 64, can be efficiently extracted to construct high-resolution models. After the desired merging process has been completed, the remaining lateral surfaces are recorded as the Hydro-Grids vertical coordinates. In some situations, the layer merging is not advisable because the lithology of the two layers is quite different. Then, the lateral grid surfaces between the two layers may be retained as a Hydro-Grids vertical coordinates.

Now referring to numeral 46 of FIG. 5, the values of the geologic properties in every merged cell are recalculated. This determination of values for merged model cells is called "upscaling". Upscaling of permeability and porosity values is a mature technology that is known to persons skilled in the art and can be found in a number of publications. Examples of publications that disclose upscaling include Durlofsky, L. J.: "Numerical Calculation of Equivalent Grid Block Permeability Tensors for Heterogeneous Porous Media," *Water Resources Research* (May 1991) 27, No. 5, 699; Pickup, G. E., Ringerose, P. S., Forester, M. M., Jensen, J. L., and Sorbie, K. S.: "Permeability Tensors for Sedimentary Structures," *Mathematical Geology* (1994) 26, 227; and Li, D., Beckner, B., and Kumar, A.: "A New Efficient Average Technique for Scaleup of Multimillion-Cell Geologic Models," *SPE Reservoir Evaluation & Engineering* (August 2001), 297.

EXAMPLE

Figure 7:
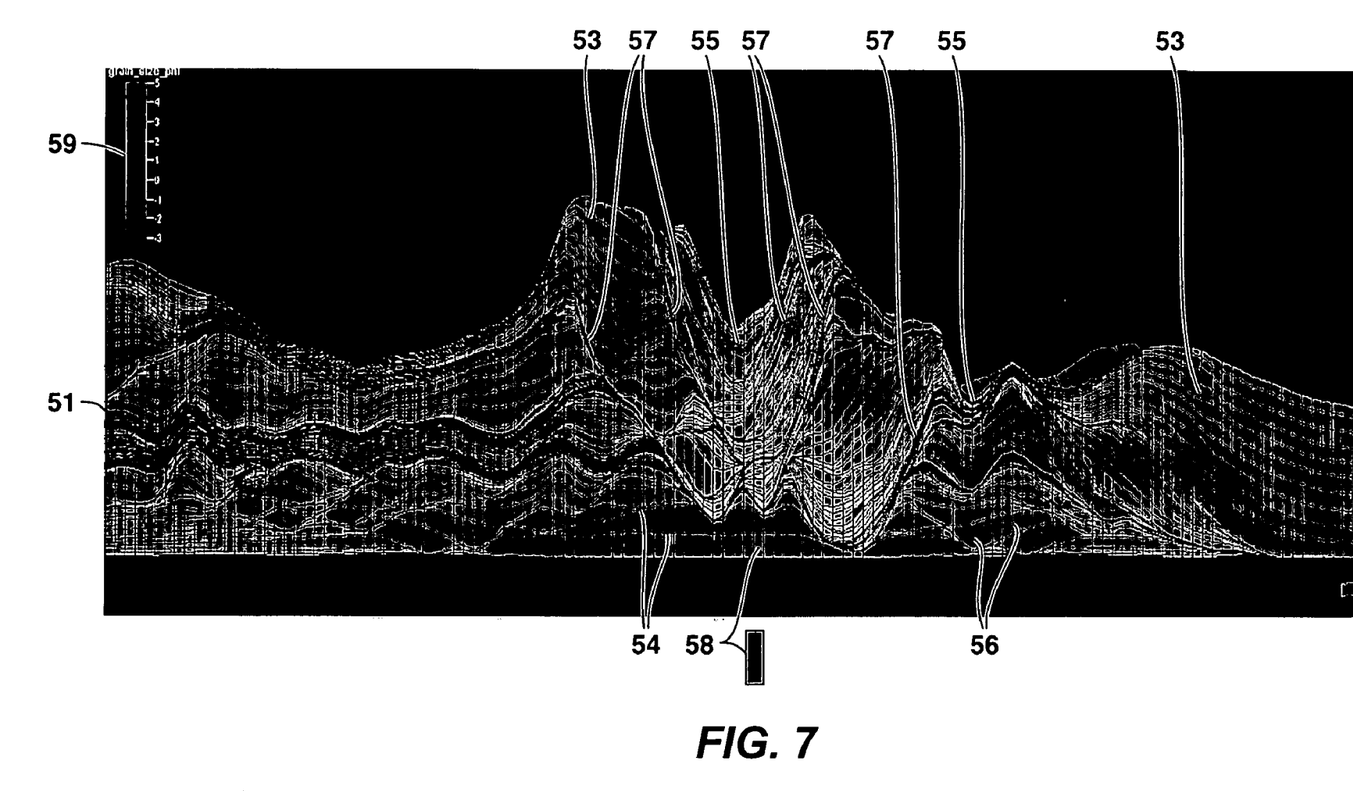
FIG. 7 is a Hydro-Grids cross-section of a complex avulsive sand body composed of several sand body lobes and channels.

FIG. 7 shows a cross-section of a complex avulsive sand body 51 composed of several sand body lobes 53 and channels 55 simulated by using a physics-based sedimentary process simulator. FIG. 7 shows that in complex sand body 51 lobes 53 and channels 55 are maintained accurately in the Hydro-Grids 58 utilizing lateral grid lines or surfaces 54 in connection with vertical grid line or surface 56. The erosion (or truncation surfaces) 57 that are important to reservoir performance simulation are preserved. The color-scale 59 in FIG. 7 represents average grain size in the phi scale (from 5 to −3).

Figure 8A:
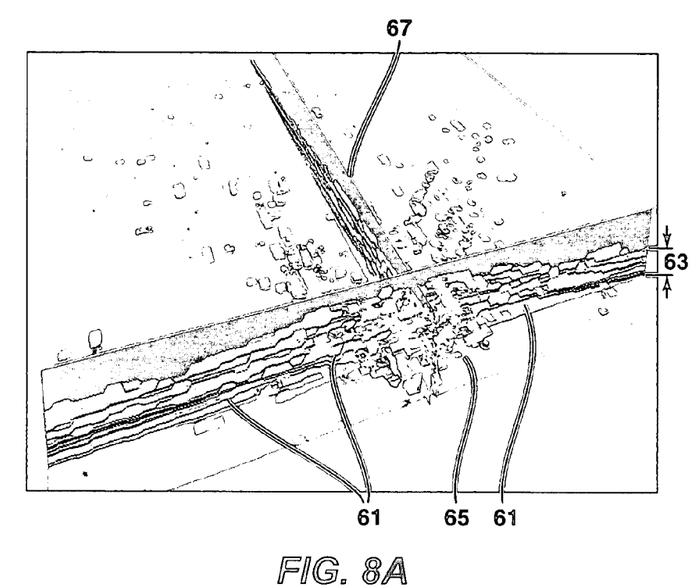
FIG. 8(a) is a cross-section illustration of sand body locations and sizes, and example deposit time surfaces populated by a sedimentary process network simulator.
Figure 8B:
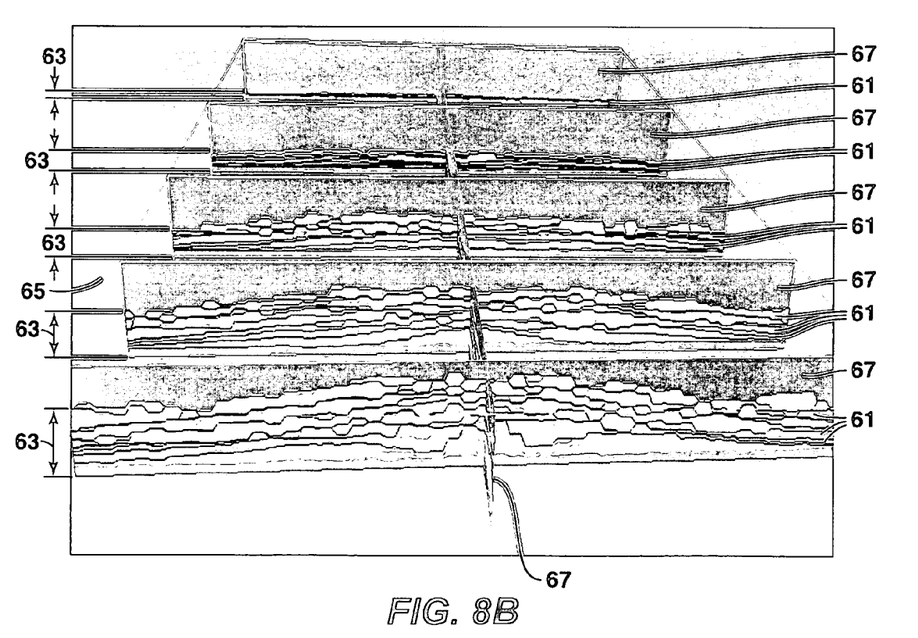
FIG. 8(b) is a cross-section illustration of deposit time surfaces on fan delta populated by a sedimentary process network simulator.

The Hydro-Grids idea can also be used in many commercially available sedimentary process simulators. FIGS. 8(*a*) and 8(*b*) illustrate example simulation results from a sedimentary process simulator, which populates sand bodies 61 of different size and shape to form a complex clastic deposit 63. FIG. 8(*a*) illustrates sand body locations 61 and sizes within an example fan delta 65, and multiple lateral deposit time surfaces 67. FIG. 8(*b*) illustrates multiple lateral deposit time surfaces 67 for representative longitudinal and transverse cross-sections for sand bodies 61 in a fan delta 65.

We claim:

1. A computer-implemented method for geologic modeling of a sedimentary basin or reservoir, comprising:
   a. obtaining geologic data;
   b. creating horizontal grid lines wherein at least one horizontal grid line represents deposit time lines based on deposition rates from the geologic data, and wherein the at least one original horizontal grid line is created by estimating the deposition rate without erosion and erosional effects are reconciled by adjusting at least one horizontal grid line;
   c. creating vertical grid lines;
   d. modeling sedimentary properties of the sedimentary basin or reservoir from the grids of geological data created by the vertical and horizontal grid lines;
   f. simulating reservoir performance using the model of the sedimentary properties of the sedimentary basin or reservoir; and
   g. developing a hydrocarbon reservoir based on the simulated reservoir performance.

2. The method of claim 1 wherein the geologic data is chosen from the group consisting of seismic data, outcrop study data, well log data, core data, forward and inverse modeling data, correlation of seismic data to sedimentary data.

3. The method of claim 1 wherein the vertical grid lines are chosen to represent favorable vertical bins.

4. The method of claim 1 wherein the sedimentary properties of the basin or reservoir are selected from the group consisting of grain size distribution, connectivity, net-to-gross, porosity, permeability, pore pressure and any combination thereof.

5. The method of claim 1 further comprising adjusting at least one horizontal grid line to favorably correspond to seismic reflection horizons in the seismic data.

6. The method of claim 5 wherein the time for adjusting at least one horizontal grid line to favorably correspond to a seismic reflection horizon in the seismic data lines is selected from the group comprising before the simulation, during the simulation, and after the simulation, and any combination thereof.

7. A method for geologic modeling of a sedimentary basin or reservoir, comprising:
   a. obtaining geologic data,
   b. using a computer, creating horizontal grid lines wherein at least one horizontal grid line is based on a deposition rate estimated from the geologic data;
   c. creating vertical grid lines;
   d. determining stratigraphic hierarchy levels of the horizontal grid lines,
   e. merging at least one neighboring horizontal grid line,
   f. upscaling the merged horizontal grid layers based on the stratigraphic hierarchy,
   g. estimating sedimentary properties from the upscaled merged layers,
   h. simulating reservoir performance from the estimated sedimentary properties, and
   i. developing a hydrocarbon reservoir based on the simulated reservoir performance;
   wherein the stratigraphic hierarchy levels assigned to the horizontal grid lines are selected from the group consisting of changes in inlet conditions, changes in simulation conditions, variation in vertical distribution of the composition of a simulated deposit, and any combination thereof.

8. The method of claim 7 further comprising repeating steps (e) and (f) until all desired horizontal grid lines are merged.

9. The method of claim 7 wherein the geologic data is chosen from the group consisting of seismic data, outcrop study data, well log data, core data, forward and inverse modeling data, correlation of seismic data to sedimentary data.

10. The method of claim 7 wherein the vertical grid lines are chosen to represent favorable vertical bins.

11. The method of claim 7 wherein the sedimentary properties of the basin or reservoir are selected from the group consisting of grain size distribution, connectivity, net-to-gross, porosity, permeability, pore pressure and any combination thereof.

12. The method of claim 7 wherein at least one original horizontal grid line is created by estimating the deposition rate without erosion and the erosional effects are reconciled by adjusting at least one horizontal grid lines to match the geologic data.

13. The method of claim 7 wherein the geologic data is seismic data and further comprising adjusting the hierarchy levels to achieve a favorable correlation with the seismic data.

14. The method of claim 13 further adjusting at least one horizontal grid line to favorably correspond to seismic reflection horizons in the seismic data.

15. The method of claim 13 wherein the time for adjusting the horizontal grid line to favorably correspond to seismic reflection horizons in the seismic data lines is selected from the group comprising before the simulation, during the simulation, and after the simulation, and any combination thereof.

16. A computer-implemented method for geologic modeling of a sedimentary basin or reservoir, comprising:
   a. obtaining geologic data,
   b. creating horizontal grid lines wherein at least one horizontal grid line is based on a deposition rate estimated from the geologic data, wherein at least one original horizontal grid line is created by estimating the deposition rate without erosion and erosional effects are reconciled by adjusting at least one of the horizontal grid lines to match the geologic data;
   c. creating vertical grid lines;

d. determining stratigraphic hierarchy levels of the horizontal grid lines,
e. merging at least one neighboring horizontal grid line,
f. upsealing the merged horizontal grid layers based on the stratigraphic hierarchy,
g. estimating sedimentary properties from the upscaled merged layers,
h. simulating reservoir performance using the estimate of the sedimentary properties from the upsealed merged layers, and
i. developing a hydrocarbon reservoir based on the simulated reservoir performance.

* * * * *